Aug. 11, 1925.  1,548,991
S. GIOVANNINI
AIR BRAKE FOR MOTOR VEHICLES AND THE LIKE
Filed April 28, 1924
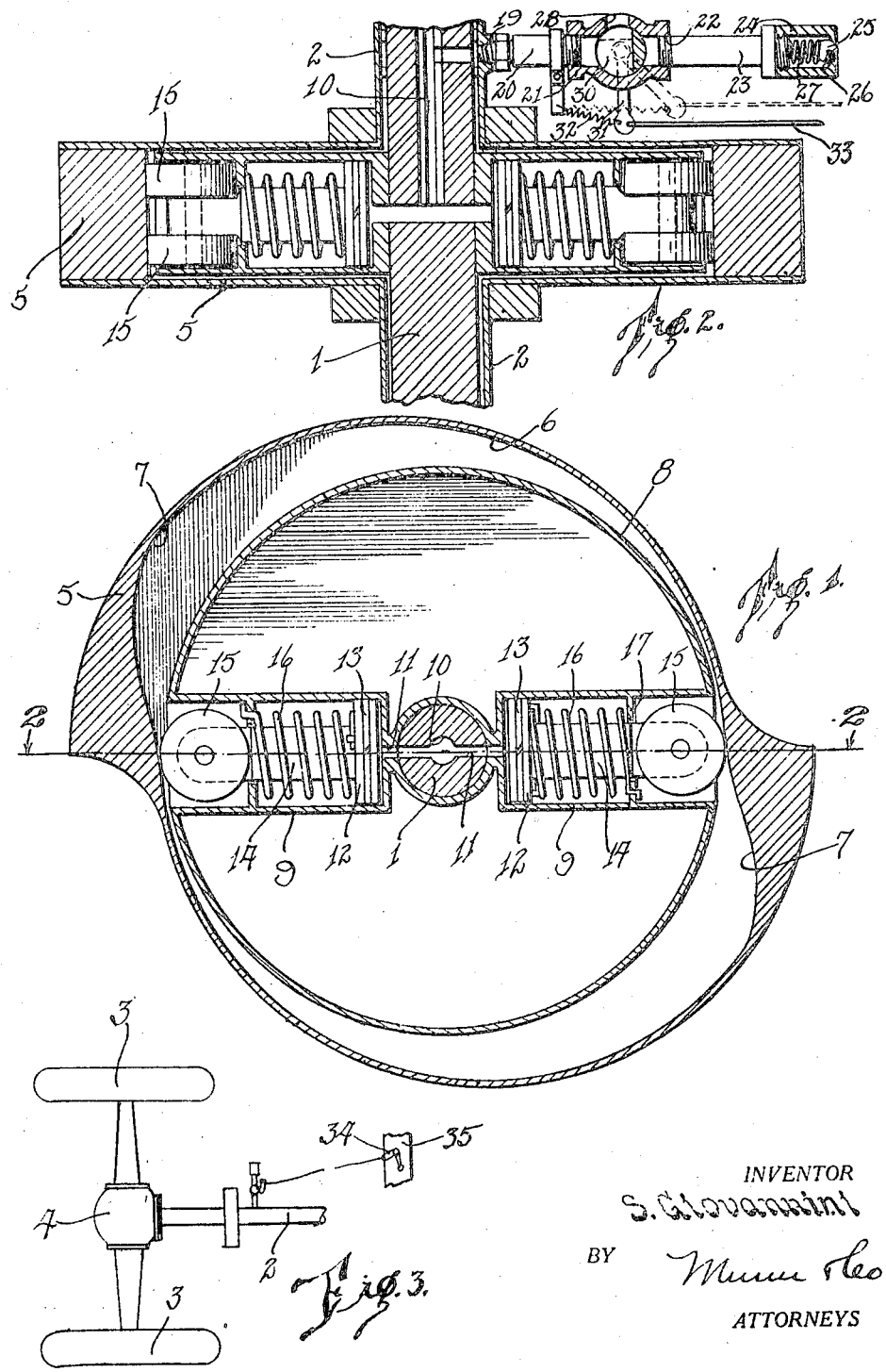
INVENTOR
S. Giovannini
BY
ATTORNEYS Patented Aug. 11, 1925.

1,548,991

UNITED STATES PATENT OFFICE.

SEBASTIAN GIOVANNINI, OF CHICAGO, ILLINOIS.

AIR BRAKE FOR MOTOR VEHICLES AND THE LIKE.

Application filed April 28, 1924. Serial No. 709,546.

*To all whom it may concern:*

Be it known that I, SEBASTIAN GIOVANNINI, a citizen of Italy, and a resident of Chicago, county of Cook, State of Illinois, have invented a new and useful Improvement in Air Brakes for Motor Vehicles and the like, of which the following is a full, clear, and exact description.

My invention relates to improvements in air brake for motor vehicles and the like, and it consists in the combinations, constructions, and arrangements herein described and claimed.

An object of my invention is to provide an air brake of the type described in which the force employed for bringing the motor vehicle or the like to a standstill may be carefully regulated so as to apply the brakes slowly or quickly, at the will of the driver. This is accomplished by the use of compressed air.

A further object of my invention is to provide a brake of the type described in which the use of frictional members is entirely precluded, thereby reducing wear of the parts to a minimum, and obviating the necessity of frequent adjustment of the parts as in the case of the ordinary type of friction brake.

A further object of my invention is to provide a brake of the type described which may be placed upon the propeller shaft of the motor vehicle, and thus apply braking force uniformly to each of the drive wheels of the vehicle. This arrangement greatly reduces the possibility of skidding which is often present where separate brakes are employed for each wheel, and the adjustment of the two brakes does not accord with one another.

A further object of my invention is to provide a brake of the type described which is simple in construction, durable and efficient, and thoroughly practical for the purpose intended.

Other objects and advantages will appear in the following specification, and the novel features of the invention will be particularly pointed out in the appended claims.

My invention is illustrated in the accompanying drawings, forming part of this application, in which Figure 1 is a sectional view of an embodiment of my invention, Figure 2 is a sectional view along the line 2—2 of Figure 1, and Figure 3 is a diagrammatic view showing the location of my improved brake when used on a motor vehicle.

In carrying out my invention I make use of the ordinary type of motor vehicle having a propeller shaft 1 and disposed within a housing 2. A pair of drive wheels 3 is driven by the propeller shaft 1 through a differential mechanism of ordinary construction, enclosed in a rear axle housing 4. This construction is found in practically every type of motor vehicle, and is thoroughly understood by those skilled in the art.

A casing 5 is disposed between adjacent parts of the propeller casing 2, (see Figure 2). This casing 5 has its inner wall 6 formed so as to provide a pair of diametrically opposed cam surfaces 7.

A circular cylinder drum 8 is rotatably disposed within the housing 5 and upon the propeller shaft 1, so as to turn therewith. The cylinder drum 8 is provided with a pair of compression cylinders 9 diametrically opposed from one another and communicating at their lowermost ends with a central opening 10, extending longitudinally on the propeller shaft 1 by means of passages 11. Each of the cylinders 9 has a piston 12 therein fitted with a piston ring 13.

A piston rod 14 extends outwardly from each of the pistons 12 and is provided with a pair of cam engaging rollers 15 at the outermost end thereof. A tension spring 16 is disposed concentric with each of the piston rods 14 between the pistons 12 and an inwardly extending flange 17 on the inner wall of the cylinder 9. This is for the purpose of forcing the rollers 15 into close engagement with the cam surfaces 7 of the casing 5 and to cause reciprocation of the pistons 12 in the cylinders 9 as the cylinder drum 8 is rotated by movement of the propeller shaft 1.

The opening 10 through the propeller shaft 1 communicates at 19 with a pipe 20 which is connected to a valve 21 having one port 22 connected with a pipe 23, which in turn is connected to a check valve 24. This check valve 24 is of the type employing a steel ball bearing 25 pressed into the port 26 of the valve by means of a spring 27, thereby permitting air to pass through the valve in one direction only. The remaining port of the valve 21 is shown at 28 and is disposed at substantially 90° from the port 22 and is normally open when the valve member 30 is in the position shown in Figure 2.

When the valve 30 is moved to the position shown in dotted lines, air may pass from the check valve 24 in one direction only, into the opening 10 in the propeller shaft. Movement of air in the opposite direction is entirely stopped.

Means for normally holding the valve 30 in the position shown in Figure 2 consists in a stem 31 associated with the valve 30 and a tension spring 32 arranged to pull the stem 31 toward the casing 2.

A cable 33 is secured to the stem 31 and has its opposite end secured to a control lever 34 disposed upon the instrument board 35 of the vehicle, whereby movement of the lever 35 may cause the stem 31 to assume the position shown in dotted lines in Figure 2. This movement of the valve 30 will close the port 28.

From the foregoing description of the various parts of the device, the operation thereof may be readily understood. The spring 32 normally holds the valve 30 in the position shown in full lines in Figure 2, and the position of the propeller shaft as in driving the vehicle upon the road will cause an oscillatory movement of air through the opening 10, the pipe 20, and the port 28 in the valve. This oscillatory movement of the air is virtually a breathing movement, and does not resist the free rotation of the cylinder drum 8 in the casing 5 in the slightest degree.

If now, the driver wishes to stop the vehicle by stopping the movement of the propeller shaft 1, the lever 34 is moved so as to partially close the valve 30, i. e., move the valve 30 toward the position shown in dotted lines in Figure 2. This will permit a limited quantity of air to pass in and out of the port 28 and air to pass in through the check valve 24. The result will be that the air from the opening 10 and the passageways 11 will become compressed, and thereby resist movement of the pistons 12 in the cylinders 9 and consequently resist movement of the cylinder drum 8 relative to the casing 5, which is stationary upon the vehicle. The result will be that the rotation of the propeller shaft 1 is resisted. The degree to which this resistance of the propeller shaft 1 is set up depends entirely upon the rotation of the valve 30 within the housing of the valve. If it is moved to the position shown in dotted lines, and the port 28 entirely closed, the air will be highly compressed and cause a quick but cushioned stop in the rotation of the propeller shaft 1. There will be no sudden jar or jamming of the wheels as in the case of the ordinary type of friction brake, which often seriously damages the running members of the vehicle, and is unpleasant to the occupants.

While I have here described my improved air brake construction as applied to motor vehicles, it should be noted that this mechanism may be applied equally as well to the wheels of a railroad car, trolley car, or other traction vehicle.

I claim:

1. An air brake of the type described comprising a plurality of cylinders fixed to rotate with the propeller shaft of a motor vehicle and extending radially therefrom, pistons for said cylinders, piston rods for said pistons, said piston rods extending exteriorly of said cylinders, a stationary cam fixed to said motor vehicle and having its cam surface in registration with the extending ends of said piston rod whereby rotation of said propeller shaft would occasion a reciprocating movement of said pistons, yieldable means for maintaining the extending ends of said piston rods in engagement with said cam, and passages communicating with the inner ends of said pistons and a throttle valve communicating with said passages for regulating or stopping the flow of air therefrom when said pistons are reciprocated.

2. An air brake of the type described comprising a pair of diametrically opposed cylinders fixed to rotate with the propeller shaft of a motor vehicle and extending radially therefrom, pistons for said cylinders, piston rods for said pistons, said piston rods extending exteriorly of said cylinders and being provided with rollers at their outermost ends, a stationary cam fixed to said motor vehicle and having its cam surface in registration with the extending ends of said piston rods, whereby rotation of said propeller shaft would occasion a reciprocating movement of said pistons, yieldable means for maintaining the extending ends of said piston rods in engagement with said cam, and passages communicating with the inner ends of said pistons, and a throttle valve communicating with said passages for regulating or stopping the flow of air therefrom when said pistons are reciprocated.

SEBASTIAN GIOVANNINI.